Aug. 9, 1966  R. A. LOUKS  3,265,225
APPARATUS FOR LEVEL PILING OF GRANULAR MATERIAL
Filed March 27, 1964  2 Sheets-Sheet 1
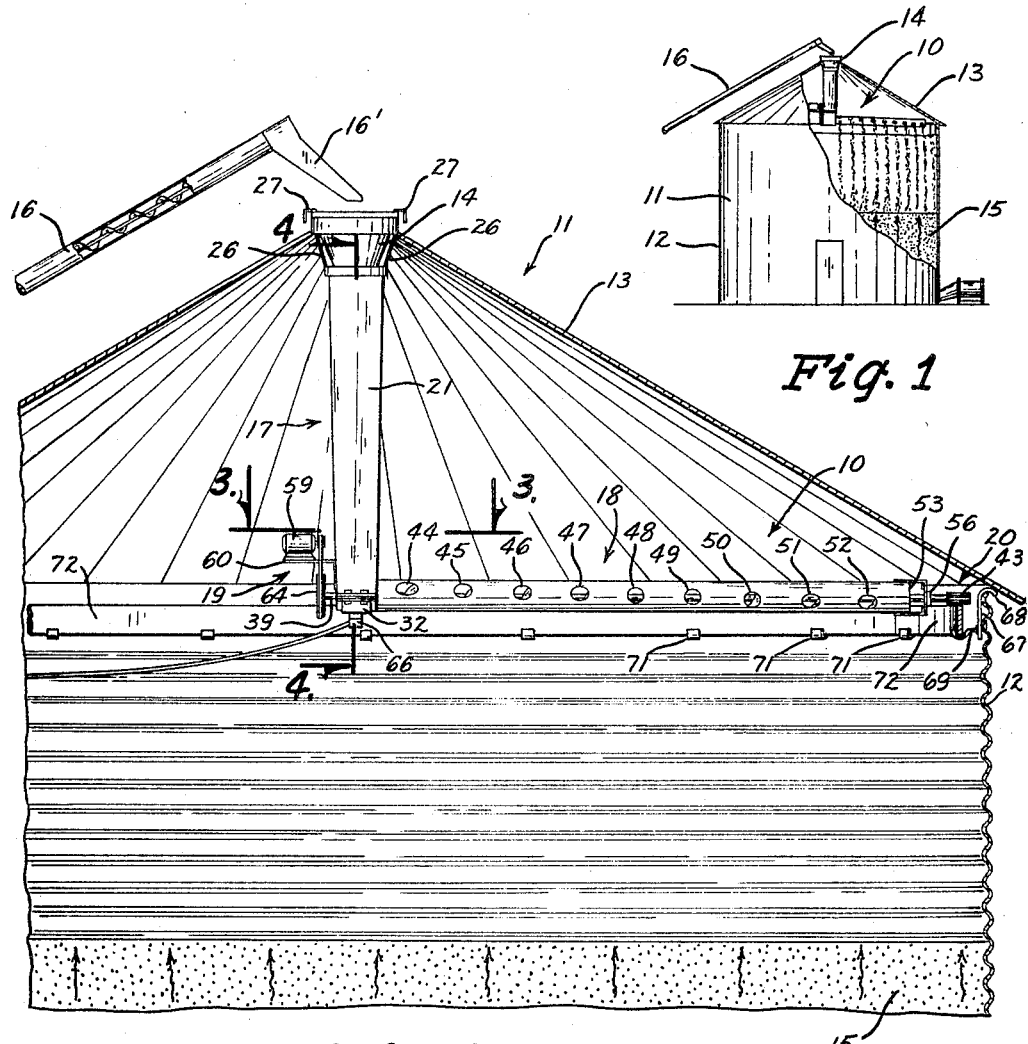
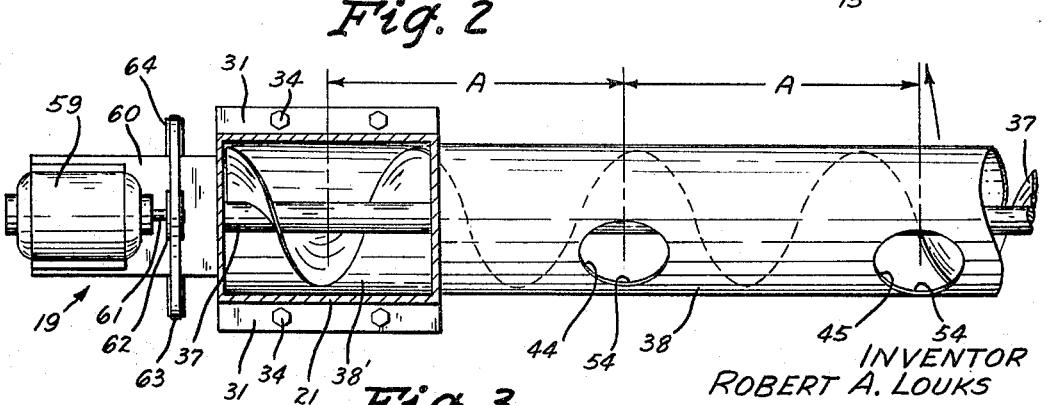
INVENTOR
ROBERT A. LOUKS
BY
W. Robert Henderson
ATTORNEY

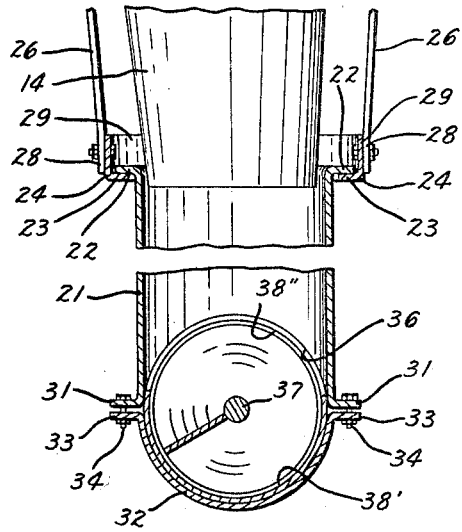
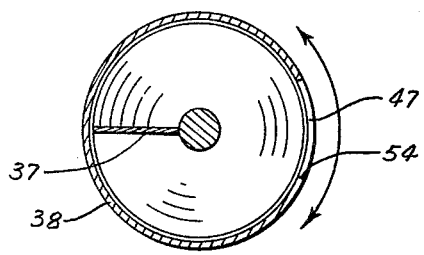
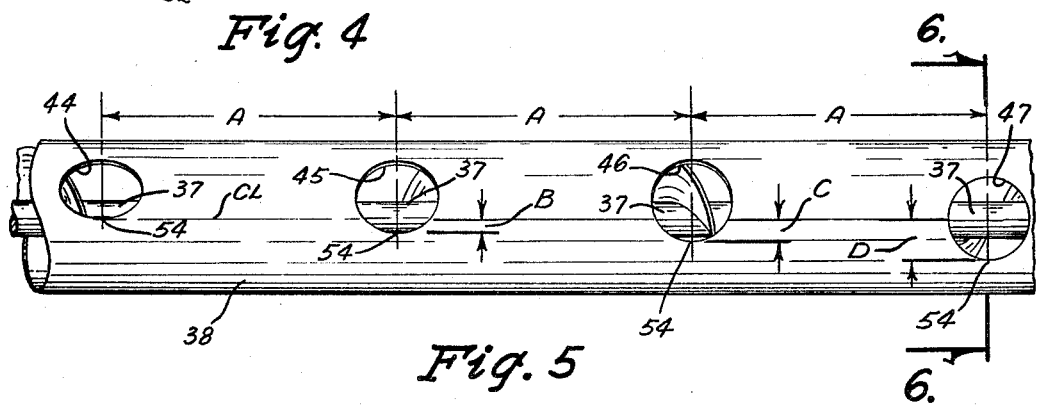
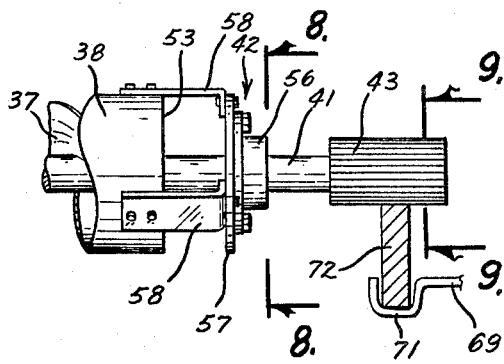
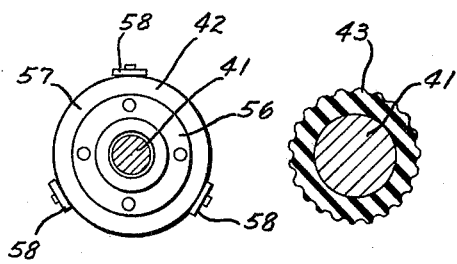
INVENTOR
ROBERT A. LOUKS
BY
*T. Robert Henderson*
ATTORNEY United States Patent Office  3,265,225
Patented August 9, 1966

3,265,225
APPARATUS FOR LEVEL PILING OF GRANULAR MATERIAL
Robert A. Louks, Gilman, Iowa
Filed Mar. 27, 1964, Ser. No. 355,254
2 Claims. (Cl. 214—17)

This invention relates generally to the storing of granular material, and more particularly to the discharging of granular material in a pile wherein the surface of the pile is level.

The stockpiling of grain and like granular farm material in storage buildings, bins and like structures, or even in the open, to await favorable marketing times or until it becomes desirable to make ultimate use of the harvested produce has continued to be an expensive and hazardous operation. The main source of difficulties is the fact that during the drying out of the green produce, a normal respiration process thereof is necessary, otherwise spoilage will set in.

Many aeration devices have been provided to provide complete circulation of air throughout the piled granular material and one such device is a perforated floor for the bottom surface of a grain bin through which treated or untreated air is forced, whereby a steady and even flow of air is forced upwardly through the grain piled within the bin. It may be readily realized that for this type of drying, and for that matter any type of drying comparable thereto, the surface of the piled grain should be level. Thus, for a given amount and timing of the airflow, all of the material is equally treated, otherwise if piles were permitted wherein the surface was not even, an uneven distribution of the air and an unequal treatment of the material as a whole would result.

It is therefore an object of this invention to provide a new and novel apparatus for discharging granular material in a pile while maintaining the surface of the pile level.

It is another object of this invention to provide a new and novel method for accomplishing the same objective.

Yet another object of this invention is to provide an apparatus operable within a conventional grain bin for receiving granular material elevated from outside the bin, and for discharging the material in a pile in the bin with the surface of the pile being level.

Still another object of this invention is to provide an apparatus and a method for discharging granular material in a level manner, wherein the material is moved radially from one point to another, discharged while being moved progressively increased quantities of a predetermined nature, and moved circularly while being discharged, whereby a circular pile of material is formed the surface of which is level.

Another object of this invention is to provide an apparatus for discharging granular material in an even manner, wherein the apparatus comprises basically an elongated tube having a plurality of longitudinally spaced, progressively lowered discharge openings, and wherein the tube is rotated about one end and a vertical axis so as to discharge the material in a continually sweeping, radial path to form a circular pile of the material the surface of which is always level.

Yet another object of this invention is to provide an elongated tube as mentioned hereinbefore with a rotatable auger mounted therein one end of which engages with a circular track, whereby rotation of the auger by a motor or the like results in lateral movement of the auger and tube in a sweeping manner about a vertical axis.

An object of this invention is the provision of a new and novel apparatus of accomplishing the above designated objectives which is simplified, economical of manufacture, effective in use, and easily serviced.

These objects, and other features and advantages of this invention will become readily apparent upon reference to the following description, when taken in consideration with the accompanying drawings:

FIG. 1 is a reduced elevational view of a conventional grain bin within which a preferred embodiment of this invention is mounted, the bin partly broken away to show the invention in operation;

FIG. 2 is an enlarged, fragmentary sectional view of the grain bin of FIG. 1, showing the material discharging and leveling apparatus of this invention in elevation;

FIG. 3 is an enlarged, fragmentary view taken along the horizontal sectional line of 3—3 in FIG. 2;

FIG. 4 is an enlarged, fragmentary, foreshortened view taken along the line 4—4 in FIG. 2;

FIG. 5 is a fragmentary side elevational view of the tube and auger of this invention;

FIG. 6 is a sectional view taken along the line 6—6 in FIG. 5;

FIG. 7 is an enlarged fragmentary elevational view of the end of the tube and auger, and showing the track therefor in section;

FIG. 8 is a sectional view taken along the line 8—8 in FIG. 7; and

FIG. 9 is a sectional view taken along the line 9—9 in FIG. 7.

Referring now to the drawings, the apparatus for discharging and leveling granular material of this invention is indicated generally at 10 in FIG. 1, and is shown in assembled condition within a conventional grain storage bin 11.

The grain bin 11 includes the usual circular corrugated wall 12 supported on a perforated floor structure (not shown) and covered by a slope roof 13 at the apex of which a circular funnel 14 is secured. When not in use, a lid (not shown) is provided to securely cover the funnel 14, and when in use, as for example when being filled with grain 15, a conventional elevator auger unit 16 is provided, the upper spout 16' being positionable over the funnel 14 for discharging grain therein.

The apparatus 10 of this invention comprises generally a hopper unit 17 (FIG. 1) for receiving and holding the grain 15 from the funnel 14; a discharge unit 18 for discharging the grain into the bin 11, operatively connected to said hopper unit 17, extended radially outwardly therefrom, and movable in a circular, sweeping manner about the bin 11; a power unit 19 for rotating the auger part of the discharge unit; and a support unit 20 for supporting the outer end of the discharge unit 18 and for providing a track over which the discharge unit moves.

Specifically, the hopper unit 17 comprises an elongated, vertically disposed hopper enclosure 21 rounded in this instance at the top (FIG. 4) and right angular at the bottom (FIG. 3). The enclosure is provided with a horizontal flange 22 (FIG. 4) at the upper end which rides in bearing engagement with the horizontal leg 23 of an L-shaped collar 24.

The collar 24 is supported in a horizontal manner below and axially aligned with the vertical axis of the funnel 14 by a trio of hangers 26 whose upper ends 27 (FIG. 2) hook over the upper edge of the funnel 14, and whose lower ends 28 (FIG. 4) are engaged by bolts with the vertical leg 29 of the collar 24. The arrangement is such that the lid (not shown) for the funnel 14 is placeable thereover without interference by the hangers 26. One can readily envisage a permanent connection of the hangers 26 with the funnel 14 or roof 13 as desired. As the upper flange 22 of the hopper enclosure rides upon the collar leg 23, the enclosure 21 is rotatable about the vertical axis of the funnel 14 and of the grain bin 11.

Flanges 31 (FIGS. 3 and 4) formed at the lower end of the hopper enclosure 21 serve to support a semi-circular band 32, the band 32 also having flanges 33 secured to the flanges 31 by fastening devices 34. The enclosure 21 is cut away at 36 (FIG. 4) to form a circular opening with the band 32 for receiving the inner end 38' of a tube 38, which is part of the discharge unit 18. The band 32 is frictionally clamped against the tube 38, but permits forcible rotation of the tube 38.

The tube 38 as best shown in FIGS. 2–6, is a six inch diameter tube the length of which is at least ten feet. In this instance, the diameter of the grain bin 11 is approximately twenty-one feet. At the inner end (FIG. 4) of the tube 38, at least the upper half is cut away at 38' so that the grain 15 received by the enclosure 21 falls into the said inner end for engagement with an inner end of an auger 37. The auger 37 extends throughout the entire length of the tube 38 and has an inner end 39 (FIG. 2) extended beyond the end 38' of the tube, and an outer end 41 (FIG. 7) extended through a bearing unit 42 secured to the tube 38. A friction drive member 43 is mounted on the outer auger end 41 for a purpose hereinafter described.

Formed within a side wall of the tube 38 are a plurality of nine circular openings 44, 45, 46, 47, 48, 49, 50, 51, and 52, (FIG. 2) which form material discharge openings with the open end 53 of the tube 38. Each of the discharge openings is three inches in diameter, and the spacing, as measured on the longitudinal axis of the tube 38, between each pair of discharge openings is one foot, as indicated by the letter A in FIGS. 3 and 5. It is also noted that the distance from the center of the hopper enclosure 21, which is the vertical axis of the enclosure and the grain bin 11, to the center of the first opening 44 (FIG. 3) is one foot, and the distance from the center of the last opening 52 and the end 53 of the tube 38 is one foot.

Beginning with the discharge opening 44 nearest the hopper enclosure 21, each opening next adjacent thereto toward the outer end 53 of the tube 38 is formed lower in the wall of the tube. Thus, as best viewed in FIG. 2, it is seen that a progressive lowering of the discharge openings occurs from the inner end of the tube 38 to the outer end thereof. Referring particularly to FIG. 5, the letter B indicates an arcuate, peripheral distance between the lower wall portion 54 of the opening 44 and the lower wall portion 54 of the opening 45 to be seven-sixteenth of an inch. It will be noted that the lower wall portion of the discharge opening 44 is on the horizontal center line CL of the tube 38. This is the normal position of tube 38.

The discharge opening 46 next adjacent the opening 45 is also seven-sixteenth of an inch lower than the opening 45, the distance C showing the lower wall portion 54 of the opening 46 to be fourteen-sixteenth inch below the center line CL of the tube. Thus, in view of the progressive lowering of the discharge openings being in equal increments, and as each increment is seven-sixteenth of an inch, the lower wall portion 54 of the opening 47 is seven-sixteenth of an inch below the portion 54 of the opening 46, and twenty-one sixteenths of an inch below the tube center line CL.

At the outer end of the tube 38, the bearing unit 42 includes a bearing 56 through which the auger shaft outer end 41 extends. The bearing 56 is secured to a plate 57 which is supported in a spaced relation from the tube 38 by a trio of brackets 58 connected to the tube.

The auger 37 of the discharge unit 18 just described is rotated by means of the power unit 19 best shown in FIGS. 2 and 3. A conventional electric motor 59, having a preferred rating of one-third horsepower, is mounted on a support plate 60 secured to the side of the enclosure 21. The output shaft 61 of the motor 59 rotates a two inch pulley 62 which transmits the drive by a belt 63 to a twelve inch pulley 64 secured to the inner end 39 of the auger 37. A conventional rotary switch 66 (FIG. 2) provides electric current to the motor 59.

Operation of the motor 59 results in rotation of the auger 37, whereby granular material within the enclosure 21 and the inner end 38' of the tube 38 is moved outwardly therefrom in a radial path within the tube 38. Due to the progressive lowering of the discharge openings 44–52, an uneven discharge of the grain 15 along the length of the tube 38 results upon rotation of the auger 37, with the amount of grain discharged from each opening progressively increasing from the opening 44 to the opening 52. This is to say that should the tube 38 remain stationary, the amount of grain 15 discharged through the closest opening 44 would be approximately one-ninth as much as the amount discharged through the opening 52. Actual tests with the invention constructed as defined have proved this.

To affect rotation of the tube 38 simultaneously with the movement of the grain along the radially extended tube 38, and with the progressive increasing discharge of the grain therefrom (FIG. 1), the support unit 20 is provided. Most conventionally built grain bins 11 have a bracket (not shown) supporting the roof 13 above the upper edge of the wall 12. Thus, a plurality of hanger brackets 67 (FIG. 2) are suspended from their upper curved ends 68 from the wall, the ends 68 inserted between the wall and the roof.

The lower horizontal ends 69 (FIG. 2) of the hanger brackets 67 are preformed in cross section in the form of a trough 71. Within the trough 71 of the plurality of circularly placed hanger brackets 67 is placed a circular track 72 (FIG. 7). By engagement of the drive member 43, which is of a rubber hose type, with the track 72, rotation of the drive member 43 results in a "walking" of the drive member 43, the auger 37, and thus the tube 38 and the hopper enclosure 21 about the vertical axis of the enclosure 21.

Importantly, as the arcuate distance of movement of each discharge opening is proportional to its radial distance from the vertical axis, of the center of the circle defined by the outer end of the tube 38, and by the track 72, and as the amount of grain discharged from the openings is determined with this factor in mind, the simultaneous radial and arcuate movement of the discharging grain results in a pile of grain (FIGS. 1 and 2) the surface of which is level.

Tests with corn have shown that for the physical embodiment described herein, an average rotation of the auger 37 of two hundred eighty to four hundred revolutions per minute results in approximately twelve hundred bushels of corn being discharged into the bin 11. The tube 38 makes approximately two revolutions per minute. Should it be desirable to discharge more grain out of the discharge openings closest to the hopper enclosure 21, after loosening the band 32, the tube 38 is rotated in a clockwise direction as indicated by the arrow in FIG. 6. Conversely, to calibrate the tube 38 so that more grain than normal is discharged from the outer openings, the tube 38 is rotated counterclockwise as indicated by the arrow in FIG. 6. The openings would then all be rotated upwardly relative to the center line CL (FIG. 5). Should a twenty-four, twenty-seven, or thirty foot bin be provided with the grain leveler 10, the distance A is increased from twelve to fourteen inches.

Although a preferred embodiment of the invention has been described hereinbefore, it is to be remembered that various modifications and alternate constructions may be made thereto without departing from the true spirit and scope of the invention as defined in the appended claims.

I claim:
1. Apparatus for discharging granular material comprising in combination:
    a substantially horizontally disposed tube movable in a circular manner about a vertical axis at one end thereof, with the opposite end defining the periphery of an imaginary circle, said tube adapted to receive granular material at said one end, and having a plurality of longitudinally spaced discharge openings formed in a side wall of said tube, the lower wall portions of said openings disposed progressively lower from the opening closest to said one end to the opening farthest therefrom;

an auger mounted within said tube for rotation therein whereby an uneven discharge of material along the length of the tube is obtained, with the amount of grain discharged progressively increasing from the opening closest to said one end to the opening farthest therefrom;

means mounted at said one end of said tube operatively engaged with said auger for rotating said auger; and means extended circularly about the vertical axis and operatively frictionally engageable with said auger, whereby rotation of said auger effects circular movement of said tube about the vertical axis, the material discharged falling in a circular pile the surface of which is level.

2. In a storage bin having an upstanding wall and a roof supported over the wall, apparatus for discharging granular material inside the bin comprising in combination:

an opening formed centrally in the roof;

hopper means suspended from the roof and disposed about said opening, said hopper means including a hopper for receiving material discharged through said opening, said hopper rotatable at its upper end about a vertical axis, said hopper depended vertically from its upper end to its lower end such that said lower end is disposed centrally within the storage bin wall;

an auger tube in communication at one end with said hopper lower end for receiving material therefrom, said auger tube extended substantially horizontally outwardly toward the wall and movable with said hopper in a circular manner about said vertical axis;

an auger rotatably mounted in said tube;

power means operatively connected to said auger for imparting rotation thereto to move the material from the inner end of said tube toward the outer end thereof; and a plurality of longitudinally extended openings formed in a side wall of said tube, each opening having a lower wall portion formed therein lower than the next adjacent opening closest to said one end, the amount of material discharged from said tube in response to rotation of said auger increasing progressively from the innermost lower wall portion to the outermost lower wall portion to effect a level filling of the storage bin.

References Cited by the Examiner

UNITED STATES PATENTS

| | | | |
|---|---|---|---|
| 565,068 | 8/1896 | Dornfield | 214—17 |
| 2,219,954 | 10/1940 | Geiger et al. | 214—17 |
| 2,711,814 | 6/1955 | McCarthy. | |
| 2,867,314 | 1/1959 | Hansen | 198—64 |
| 3,145,855 | 8/1964 | Plugge et al. | 214—17 |

GERALD M. FORLENZA, *Primary Examiner.*

HUGO O. SCHULZ, *Examiner.*

R. G. SHERIDAN, *Assistant Examiner.*